United States Patent
Carr et al.

(10) Patent No.: US 9,721,455 B1
(45) Date of Patent: Aug. 1, 2017

(54) ADAPTIVE ALARM

(71) Applicant: INTERNATIONAL BUSINESS MACHINES CORPORATION, Armonk, NY (US)

(72) Inventors: Kevin C. Carr, Raleigh, NC (US); Al Chakra, Apex, NC (US); Marit L. Imsdahl, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/008,510

(22) Filed: Jan. 28, 2016

(51) Int. Cl.
 *G08B 23/00* (2006.01)
 *G08B 25/00* (2006.01)
(52) U.S. Cl.
 CPC ................... *G08B 25/008* (2013.01)
(58) Field of Classification Search
 CPC ................... G08G 3/00; G06Q 10/00
 See application file for complete search history.

(56) References Cited

U.S. PATENT DOCUMENTS

| | | | |
|---|---|---|---|
| 8,339,259 B1 | 12/2012 | Biere et al. | |
| 8,432,267 B2 | 4/2013 | Lee et al. | |
| 2003/0001727 A1 | 1/2003 | Steinmark | |
| 2003/0222765 A1 | 12/2003 | Curbow et al. | |
| 2005/0227712 A1 | 10/2005 | Estevez et al. | |
| 2009/0016166 A1 | 1/2009 | Abuelsaad | |
| 2009/0285384 A1* | 11/2009 | Pollock | H04M 3/436 379/265.09 |
| 2012/0300598 A1* | 11/2012 | Murray | G04G 13/02 368/251 |
| 2013/0315041 A1* | 11/2013 | Hiremath | G06Q 10/10 368/10 |
| 2014/0171146 A1 | 6/2014 | Ma et al. | |

FOREIGN PATENT DOCUMENTS

EP 2367146 A1 9/2011

* cited by examiner

*Primary Examiner* — Shirley Lu
(74) *Attorney, Agent, or Firm* — Cantor Colburn LLP; David Zwick (57) ABSTRACT

Embodiments include methods, systems and computer program products for creating event reminders on a computational system. Aspects include receiving an alarm system input, the alarm system input including an event identifier, an event time, and an event influencer. Aspects also include calculating an alarm time based upon the alarm system input. Aspects also include creating an alarm signal at the alarm time. Aspects also include outputting the alarm signal.

14 Claims, 5 Drawing Sheets

ADAPTIVE ALARM

BACKGROUND

The present invention relates to alarm systems, and more specifically, to alarm systems that dynamically update and modify a wake time based on external data.

People depend on alarm systems to ensure timely attendance. For example, meetings can be scheduled frequently and updated and rescheduled frequently. When meetings are scheduled early in the morning, it is frequently up to the attendee to calculate a wake time without the aid of electronic devices based on a scheduled meeting time. For example, a meeting attendee might back calculate a wake time based upon likely travel time and personal preparation time prior to setting an alarm the evening before. Such actions can become tedious and, in some cases, more difficult if meeting organizers change meeting plans in close proximity to the event start time. For example, postponement of a meeting that were to occur at 6 am to a start time of 10 am might needlessly deprive an attendee of several hours of sleep if the postponement notification arrived after the attendee's alarm was set and the attendee asleep.

In some cases, knowledge of the probability of a meeting occurring based on external criteria could be useful, for example, in knowing what time to set an alarm to wake. For example, a meeting invite for 6 am sent to a team of thirty employees could be more likely to be rescheduled if a key meeting attendee declines the request. If that key attendee declines the request after another attendee has already set an alarm and gone to sleep, that other attendee is highly likely to needlessly lose several hours of sleep.

SUMMARY

According to an embodiment of the present disclosure, a method for creating an alarm signal comprises receiving an alarm system input, the alarm system input comprising an event identifier, an event time, and an event influencer. The method also includes calculating an alarm time based upon the alarm system input. The method also includes creating an alarm signal at the alarm time. The method also includes outputting the alarm signal.

According to another embodiment of the present disclosure, a processing system for creating alarm signals includes a processor in communication with one or more types of memory. The processor is configured to receive an alarm system input, the alarm system input comprising an event identifier, an event time, and an event influencer. The processor is also configured to calculate an alarm time based upon the alarm system input. The processor is also configured to create an alarm signal at the alarm time. The processor is also configured to output the alarm signal.

According to yet another embodiment of the present disclosure, a computer program product includes a non-transitory storage medium readable by a processing circuit and storing instructions for execution by the processing circuit for performing a method. The method includes receiving an alarm system input, the alarm system input comprising an event identifier, an event time, and an event influencer. The method also includes calculating an alarm time based upon the alarm system input. The method also includes creating an alarm signal at the alarm time. The method also includes outputting the alarm signal. The computer program product also includes a user interface including a user input interface and an output display.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for creating an alarm signal.

Figure 1:
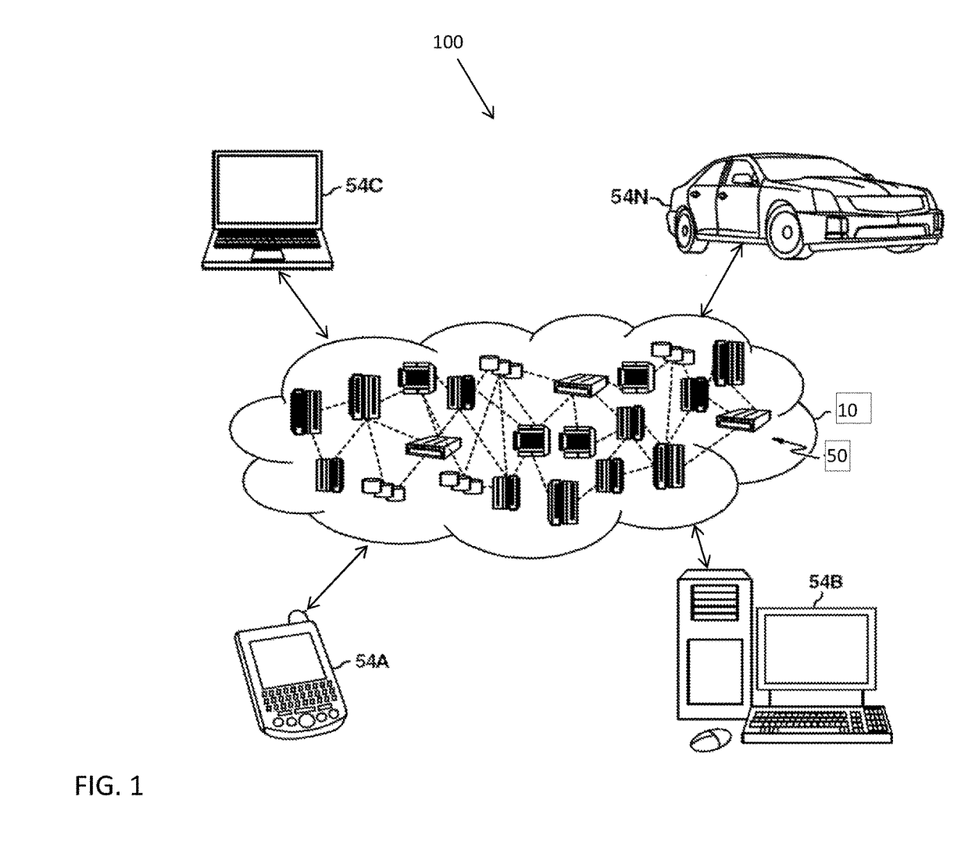
FIG. 1 illustrates a cloud computing environment capable of supporting core logic included in a mobile device data allocation system according to a non-limiting embodiment.

With reference now to FIG. 1, a cloud computing environment 10 capable of supporting the teachings herein is illustrated according to a non-limiting embodiment. As shown, cloud computing environment 10 comprises one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. The nodes 50 may communicate with one another. They may be grouped (not shown) physically or virtually, in one or more networks, such as Private, Community, Public, or Hybrid clouds as described hereinabove, or a combination thereof. This allows cloud computing environment 10 to offer infrastructure, platforms and/or software as services for which a cloud consumer does not need to maintain resources on a local computing device. It is understood that the types of computing devices 54A-N shown in FIG. 2 are intended to be illustrative only and that computing nodes 50 and cloud computing environment 10 can communicate with any type of computerized device over any type of network and/or network addressable connection (e.g., using a web browser).

Figure 2:
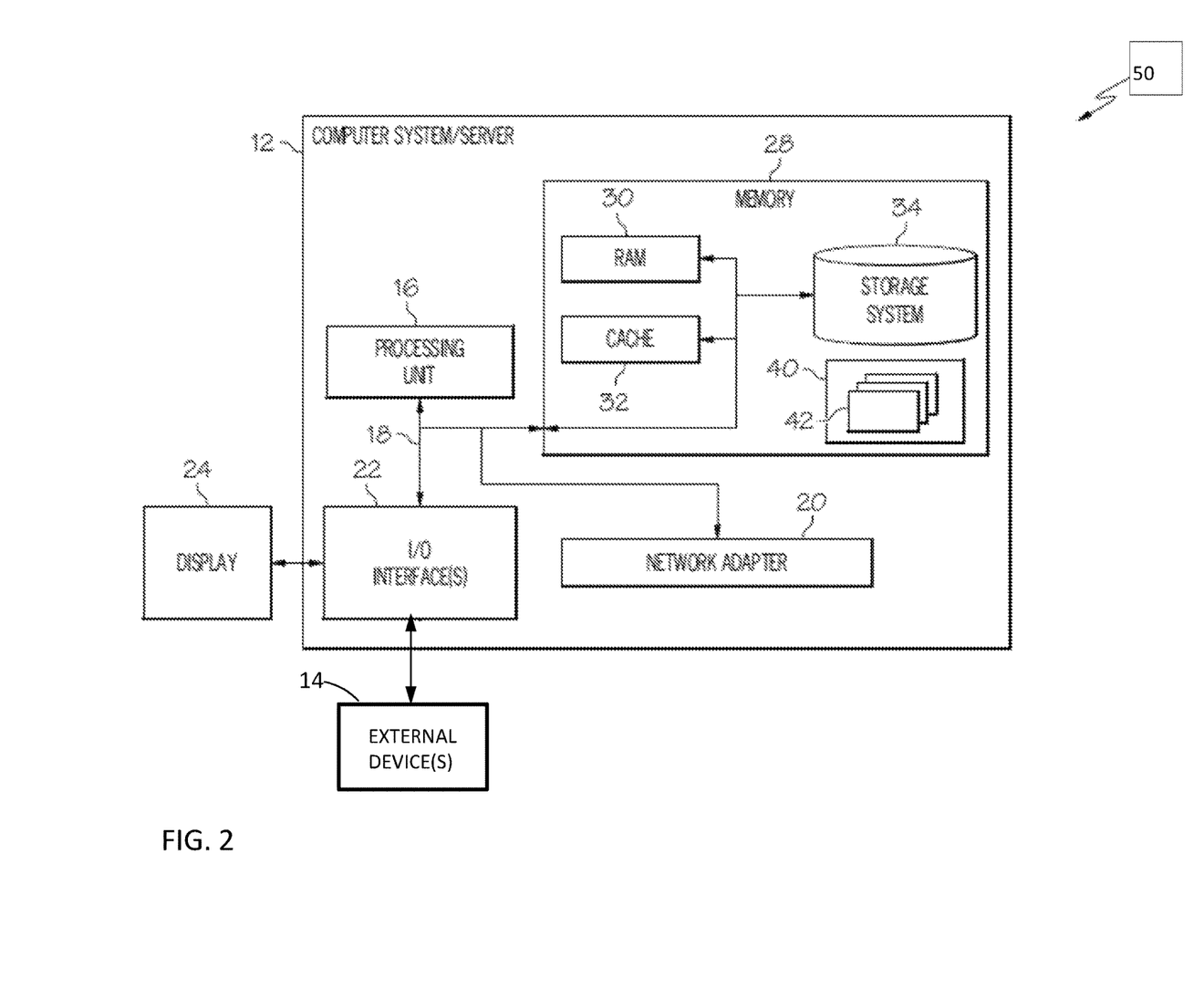
FIG. 2 is a schematic diagram of a cloud computing node included in a distributed cloud environment.

Referring now to FIG. 2, a schematic of a cloud computing node 50 included in a distributed cloud environment or cloud service network is shown according to a non-limiting embodiment. The cloud computing node 50 is only one example of a suitable cloud computing node and is not intended to suggest any limitation as to the scope of use or functionality of embodiments of the invention described herein. Regardless, cloud computing node 50 is capable of being implemented and/or performing any of the functionality set forth hereinabove.

In cloud computing node 50 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in cloud computing node 50 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
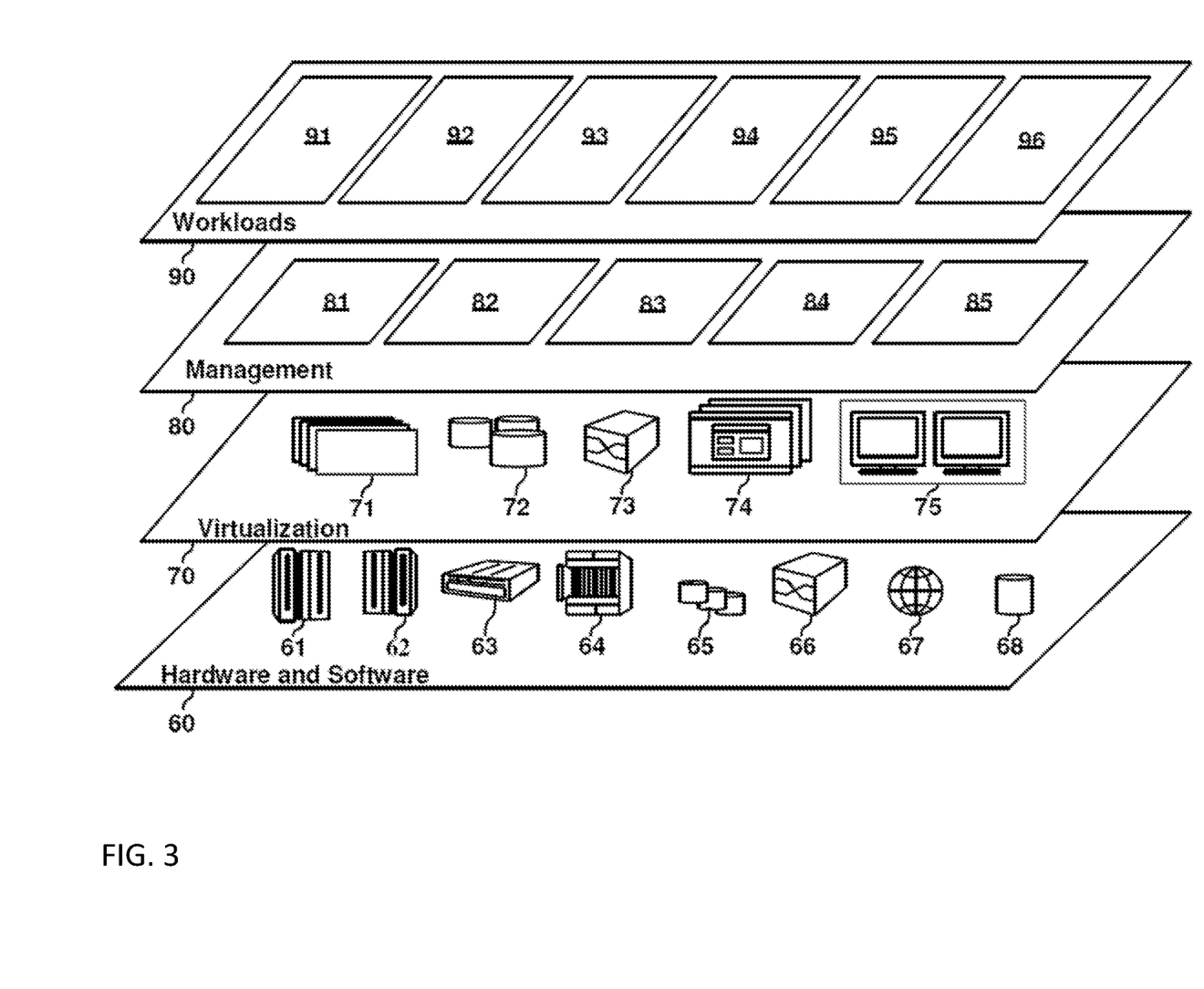
FIG. 3 is a set of functional abstraction layers provided by a cloud computing environment capable of supporting core logic included in a mobile device data allocation system according to a non-limiting embodiment.

Referring now to FIG. 3, a set of functional abstraction layers provided by cloud computing environment 10 is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provided prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Although a cloud environment capable of supporting the core logic of a data service network system is described in detail above, it should be appreciated that the core logic of the data service network system can reside locally on one or more of the devices 54A-54N. For instance, each mobile device 54A may have installed locally thereon the core logic of the data service network system. In this manner, the mobile devices 54 can perform locally the various features and operations of the data service network system.

Figure 4:
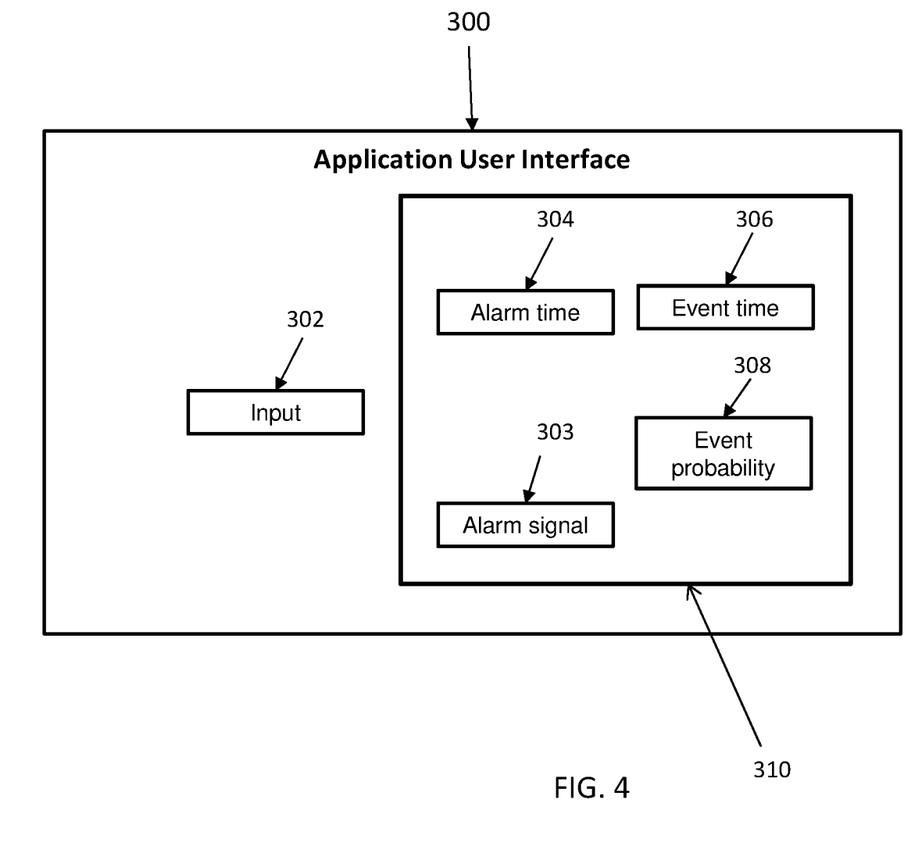
FIG. 4 is a schematic diagram illustrating a user interface of an alarm system according to an exemplary embodiment.

Referring now to FIG. 4, an application user interface for an alarm signal in accordance with an exemplary embodiment is illustrated. As illustrated, the system includes a user interface 300, which includes an input 302. The input 302 can be any input that receives input data from a user or external source to a processing system.

In some embodiments, the input data includes user input, which is information provided from a user to the system. In some embodiments, the input data includes external input, which is information provided from external sources to the system.

Exemplary user input data that can be provided from a user includes any information that can be directly or indirectly useful in determining a desired alarm time. For example, user input data provided by a user can include personal preparation time, travel time, time required for meals, or meeting related preparation time. User input data can also include direction to external sources of data. For example, user input can direct the system to a calendar account or entry, text message, email account, voice messaging system, employee personnel chart or organizational chart, contact list, travel information, including flight or rail itineraries, traffic reports, weather information, or news sources.

Exemplary external input data includes electronic calendar entry data, text messages, email messages, voice messages, business information, travel information, including flight itineraries, flight status, rail itineraries, train status, traffic reports, weather information and reports, and news sources.

Input data can be provided in any electronic format. Input data includes, for example, numeric data, character data, human readable text, date data, time data, object data, binary data, graphic data, voice data, and audio data. In one embodiment, input data includes a calendar change.

Input data can include a variety of information pertaining to a scheduled event. For example, input data can include a text message informing of a change in event time. In such cases, for example, natural language processing (NLP) can be used. NLP algorithms can be based, for example, on machine learning, especially statistical machine learning. One exemplary implementation of NLP mechanisms that utilize machine learning is a question and answer (QA) system, such as the IBM Watson™ QA system. In some embodiments, machine-learning paradigms call for using general learning algorithms sometimes grounded in statistical inference to automatically learn rules through the analysis of large corpora of typical real-world examples. Information extracted can include meeting cancellations, meeting schedule updates, or meeting attendee updates. Many different classes of machine learning algorithms have been applied to NLP tasks. These algorithms take as input a large set of "features" that are generated from the input data. NLP can be used with input data from other sources, for example, weather related data, traffic alerts, or calendar information.

In some embodiments, a user can opt in to provide alarm system access to a set of designated external sources, such as user text messages, voice messages, and personal calendar entries. In some embodiments, a user can opt to provide only manual data, such as personal preparation time and travel time.

Input data pertaining to the event is not limited to the start time of the event and can include, for example, speaker line up, presenter scheduled time, event attendees, and individual attendee information, such as role within the meeting or within the company. For example, a user may be scheduled to attend only a portion of an all-day event as a presenter for a given session and, therefore, be primarily interested in a subset of the event schedule. In such a case, for example, the alarm system can create an alarm signal at an alarm time based, at least in part, upon the scheduled time of the user's presentation at the event.

In one embodiment, the user input 302 can be a computer keyboard or cellular phone type pad. In some embodiments, the user input 302 is a voice recorder. In one embodiment, the user input 302 can be a touch sensitive button or a touch sensitive screen, for instance on a cellular phone or a tablet or a TV. User interface 300 interacts with a processing system to generate an alarm signal.

In some embodiments, the alarm system output includes an alarm signal 303. The alarm signal can include an audible signal, a visual signal or an electrical signal. The alarm signal 303 can be provided to the user on an output display 310 included in the user interface 300.

The output display 310 can include a variety of information, for example, an alarm time 304 output to the user interface 300. An alarm time can be, for example, the time that the alarm provides a signal for a user to wake to allow for personal preparation, meals, travel, meeting preparation, and the like. In some embodiments, the output display 310 includes an event time 306 output to the user interface 300. In some embodiments, the alarm signal includes an event probability 308 output to the user interface 300. The output display 310 can include any information pertaining to the alarm signal including, but not limited to, traffic information, weather information, meeting information, historic meeting information, meeting attendees, anticipated personal preparation time, anticipated meal time, anticipated travel time, flight information, and identification of applicable external sources.

For example, a user may desire to have an alarm that automatically adjusts the time of an alarm signal based upon anticipated traffic and personal preparation time. A user can input a meeting time and a value reflecting the amount of time for personal preparation. The alarm system can receive external traffic information prior to waking the user and can automatically adjust the time of the alarm signal based upon the received input. The output display 310 can, for example, include the alarm time 304, the event time 306, and the anticipated travel time. In some embodiments, the output display 310 provides only the alarm signal 303 and an event time 306 or the alarm time 304.

In some embodiments, the alarm signal 303 is output to a device external to the alarm system. For example, an alarm signal 303 can include an auditory signal output to a cellular phone, a visual signal output to a lamp, a text message sent to a user, a signal sent to a physical alarm clock, or a voice message.

In some embodiments, the alarm signal 303 provides a haptic feedback to a user. Haptic feedback can include, but is not limited to, a feel that can be generated based on information stored in the computing device, such as heat, vibration, including mild vibration and vigorous vibration, auditory signals, including sounds of varying volume, type, beat, or combinations thereof, or device temperature, for example wherein a device can increase temperature and become warm to the touch.

Figure 5:
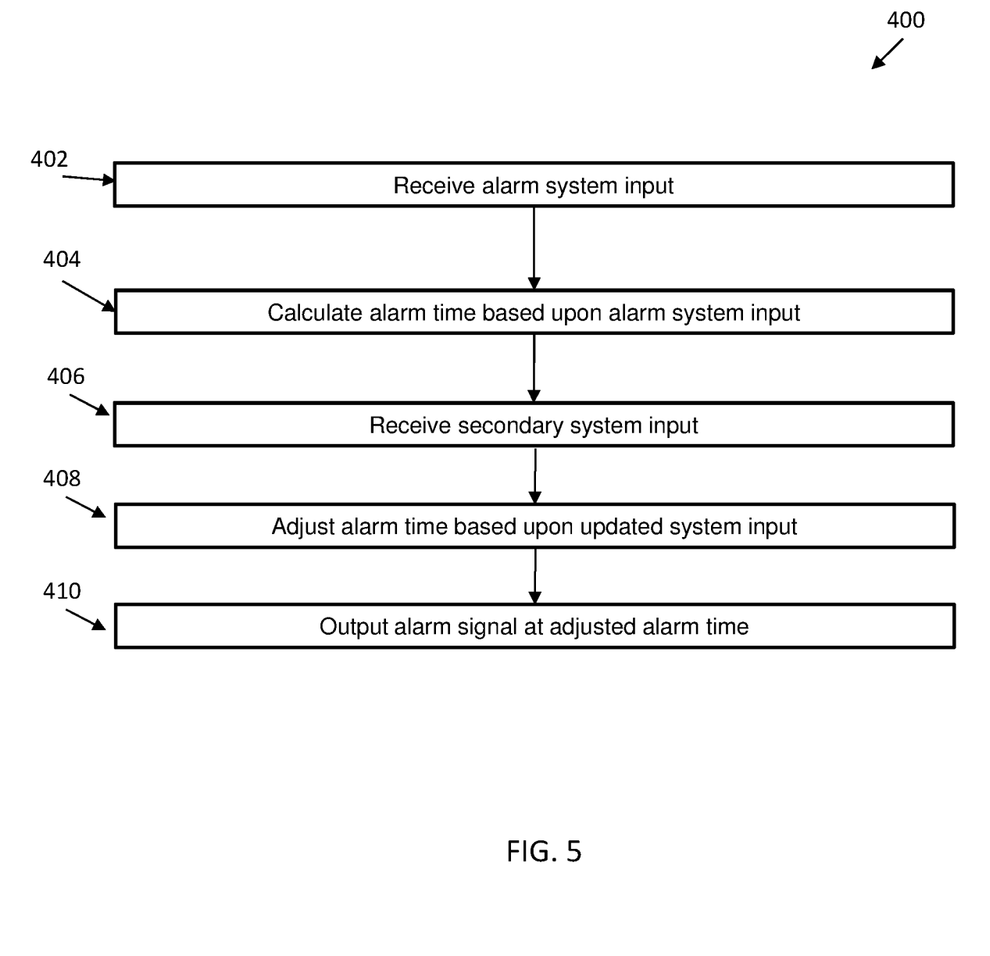
FIG. 5 is a flow diagram of a method for creating an alarm signal according to an exemplary embodiment.

Referring now to FIG. 5, a flow diagram of a method 400 for creating an alarm signal in accordance with an exemplary embodiment is shown. As shown at block 402, the method 400 includes receiving an alarm system input. Next as shown at block 404, the method includes calculating an alarm time based upon the alarm system input. In some embodiments, the method 400 also includes, as shown at block 406, receiving a secondary system input. Next, as shown at block 408, the method 400 includes adjusting the alarm time based upon the updated system input. The method 400 includes, as shown at block 410, outputting an alarm signal at the alarm time.

In one embodiment, the alarm system automatically adjusts an alarm time based upon updated input data. For example, an alarm scheduled for a designated time can update to change to an earlier time based upon receipt of data reflecting weather conditions (e.g., snow) to allow greater travel time. As an additional example, an alarm scheduled for a designated time can reset to null, or cancel the event, if updated data indicates a key attendee will not be in attendance. For example, the meeting presenter may experience a flight cancellation, or flight delay necessitating postponing a meeting or cancelling a meeting.

In one embodiment, the alarm system calculates a meeting probability based upon input data. For example, the alarm system can receive historical data regarding user attendance habits correlated with other input parameters. For example, historical data can indicate that a certain attendee's presence or absence correlates with a user's attendance or absence. The alarm system can receive a notification that that attendee will be absent, and thus assign a probability that the event will proceed. As another example, the alarm system can receive a notification that an attendee has double booked the event time. Alternatively, the alarm system can receive a notification that a user's superior will be present at a meeting and, thus, assign a 100% probability that the event will take place.

In some embodiments, the alarm system can output the resultant probability to the output display. In some embodiments, a meeting probability can be used to cancel a meeting or assign an alarm time of null.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for creating an alarm signal, comprising:
    receiving, by a processing device, an alarm system input, the alarm system input comprising an event identifier, an event time, and an event influencer, wherein the event influencer comprises historical data regarding user attendance habits correlated with an input parameter;
    calculating, by the processing device, an event probability;
    calculating, by the processing device, an alarm time based upon the alarm system input and the event probability;
    creating, by the processing device, an alarm signal at the alarm time; and
    outputting the alarm signal.

2. The method of claim 1, wherein the alarm system input comprises human readable text.

3. The method of claim 2, wherein the alarm system input comprises a text message.

4. The method of claim 1, wherein the alarm system input comprises voicemail.

5. The method of claim 1, wherein the alarm system input comprises calendar data.

6. The method of claim 1, further comprising conducting, by the processing device, natural language processing of the alarm system input.

7. The method of claim 1, wherein the alarm time is null.

8. The method of claim 1, further comprising, prior to outputting the alarm signal:
    receiving, by the processing device, an updated system input; and
    recalculating, by the processing device, the alarm time based upon the updated system input.

9. A processing system for creating alarm signals, comprising:
    a processor in communication with one or more types of memory, the processor configured to:
    receive an alarm system input, the alarm system input comprising an event identifier, an event time, and an event influencer, wherein the event influencer comprises historical data regarding user attendance habits correlated with an input parameter;
    calculate an event probability;
    calculate an alarm time based upon the alarm system input and the event probability;
    create an alarm signal at the alarm time; and
    output the alarm signal.

10. The processing system of claim 9, wherein the system input comprises human readable text.

11. The processing system of claim 9, wherein the processor is configured to conduct natural language processing of the alarm system input.

12. A computer program product for creating alarm signals, comprising:
    a non-transitory storage medium readable by a processing circuit and storing instructions for execution by the processing circuit for performing a method comprising:
        receiving an alarm system input, the alarm system input comprising an event identifier, an event time, and an event influencer, wherein the event influencer comprises historical data regarding user attendance habits correlated with an input parameter;
        calculating, by the processing device, an event probability;
        calculating an alarm time based upon the alarm system input and the event probability;
        creating an alarm signal at the alarm time, and
        outputting the alarm signal; and
    a user interface comprising:
        a user input interface, and
        an output display.

13. The computer program product of claim 12, wherein the system input comprises human readable text.

14. The computer program product of claim 12, wherein the alarm time is null.

* * * * *